(12) United States Patent
Benedetto et al.

(10) Patent No.: US 10,480,116 B2
(45) Date of Patent: Nov. 19, 2019

(54) DRYING APPLIANCE THAT PERFORMS AFTER-CARE CYCLE ON A LOAD OF LAUNDRY AFTER COMPLETION OF A PRIMARY DRYING CYCLE AND METHOD FOR PERFORMING THE AFTER-CARE CYCLE

(71) Applicant: WHIRLPOOL CORPORATION, Benton Harbor, MI (US)

(72) Inventors: Gianluca Benedetto, Fabriano (IT); Giuseppina Pia Potena, Fabriano (IT); Matthew D. Rhodes, Fabriano (IT)

(73) Assignee: Whirlpool Corporation, Benton Harbor, MI (US)

( * ) Notice: Subject to any disclaimer, the term of this patent is extended or adjusted under 35 U.S.C. 154(b) by 77 days.

(21) Appl. No.: 15/726,965

(22) Filed: Oct. 6, 2017

(65) Prior Publication Data

US 2019/0106831 A1    Apr. 11, 2019

(51) Int. Cl.
*D06F 58/20*    (2006.01)
*D06F 58/28*    (2006.01)
*D06F 58/24*    (2006.01)

(52) U.S. Cl.
CPC .......... *D06F 58/203* (2013.01); *D06F 58/206* (2013.01); *D06F 58/24* (2013.01); *D06F 58/28* (2013.01); *D06F 2058/289* (2013.01); *D06F 2058/2864* (2013.01); *D06F 2058/2893* (2013.01)

(58) Field of Classification Search
CPC .................. D06F 58/203; D06F 58/28; D06F 2058/2864; D06F 2058/2893

USPC .......................................................... 34/321
See application file for complete search history.

(56) References Cited

U.S. PATENT DOCUMENTS

| | | | | |
|---|---|---|---|---|
| 4,621,438 A * | 11/1986 | Lanciaux | ................ | D06F 58/04 |
| | | | | 34/242 |
| 5,546,678 A * | 8/1996 | Dhaemers | ............... | D06F 58/10 |
| | | | | 34/224 |
| 7,162,812 B2 | 1/2007 | Cimetta et al. | | |
| 8,104,191 B2 * | 1/2012 | Ricklefs | ................ | D06F 58/203 |
| | | | | 34/474 |
| 8,166,669 B2 | 5/2012 | Park et al. | | |
| 8,276,293 B2 | 10/2012 | Ricklefs et al. | | |
| 8,468,718 B2 * | 6/2013 | Favret | ..................... | D06F 58/28 |
| | | | | 134/34 |
| 9,334,601 B2 | 5/2016 | Doh et al. | | |
| 9,605,375 B2 | 3/2017 | Frank et al. | | |
| 9,663,894 B2 | 5/2017 | Kim et al. | | |
| 9,834,882 B2 * | 12/2017 | Patil | ..................... | F26B 21/086 |

(Continued)

FOREIGN PATENT DOCUMENTS

| | | | | |
|---|---|---|---|---|
| DE | 4306217 A1 * | 9/1994 | ............ | D06F 58/02 |
| EP | 2390397 A1 * | 11/2011 | ........... | D06F 35/005 |

(Continued)

*Primary Examiner* — Stephen M Gravini
(74) *Attorney, Agent, or Firm* — Price Heneveld LLP

(57) ABSTRACT

A method for processing laundry after completion of a drying cycle includes maintaining residual fluid within an airflow path of the appliance, wherein the residual fluid results from a primary drying cycle. A heat pump system is activated and a blower delivers the residual fluid to the drum. A drum temperature is maintained within the drum at a predetermined temperature range during performance of the after-care cycle.

20 Claims, 9 Drawing Sheets

(56) References Cited

U.S. PATENT DOCUMENTS

| | | | | |
|---|---|---|---|---|
| 10,196,774 | B2 * | 2/2019 | Jung | D06F 58/206 |
| 2009/0071032 | A1 | 3/2009 | Kreutzfeldt et al. | |
| 2012/0090191 | A1 * | 4/2012 | Colombo | D06F 58/28 |
| | | | | 34/282 |
| 2018/0237980 | A1 * | 8/2018 | Xu | D06F 58/206 |
| 2018/0245271 | A1 * | 8/2018 | Bocchino | D06F 58/206 |
| 2018/0245274 | A1 * | 8/2018 | Bocchino | D06F 58/22 |
| 2018/0320304 | A1 * | 11/2018 | Vitali | D06F 58/28 |
| 2019/0062985 | A1 * | 2/2019 | Christensen | D06F 58/26 |

FOREIGN PATENT DOCUMENTS

| | | | | |
|---|---|---|---|---|
| EP | 2441880 A1 * | 4/2012 | | D06F 58/28 |
| EP | 2466001 | 6/2012 | | |
| EP | 2765235 | 8/2014 | | |
| EP | 3173009 | 5/2017 | | |

* cited by examiner

DRYING APPLIANCE THAT PERFORMS AFTER-CARE CYCLE ON A LOAD OF LAUNDRY AFTER COMPLETION OF A PRIMARY DRYING CYCLE AND METHOD FOR PERFORMING THE AFTER-CARE CYCLE

FIELD OF THE DEVICE

The device is in the field of laundry appliances, and more specifically, a laundry appliance that performs an after-care cycle for maintaining freshness of a load of laundry after completion of a primary drying cycle.

SUMMARY

In at least one aspect, a method for processing laundry after completion of a drying cycle includes maintaining residual fluid within an airflow path of the appliance, wherein the residual fluid results from a primary drying cycle. A heat pump system is activated and a blower delivers the residual fluid to the drum. A drum temperature is maintained within the drum at a predetermined temperature range during performance of the after-care cycle.

In at least another aspect, a method for processing laundry after completion of a drying cycle includes maintaining residual fluid at least within an airflow path that includes a drum for processing laundry. An after-care cycle is activated that is configured to operate for a predetermined after-care time period. A drum temperature is maintained within the drum at a predetermined temperature range during performance of the after-care cycle. A heat pump system is activated when the drum temperature reaches a lower limit of the predetermined temperature range, wherein the residual fluid is delivered to the drum. The heat pump system is deactivated when the drum temperature reaches an upper limit of the predetermined temperature range. The after-care cycle is deactivated at the earlier of a manual termination of the after-care cycle and an expiration of the predetermined after-care time period.

In at least another aspect, a laundry appliance includes a heat pump system having a compressor and a heat exchanger. A drum is configured to process laundry. A blower delivers process air through an air flow path that includes the rotating drum and the heat exchanger. The compressor, the drum and the blower operate to perform a drying cycle and an after-care cycle that is activated after completion of the drying cycle. The after-care cycle defines an active state wherein the compressor and the drum operate until the process air leaving the drum has a drum temperature that is approximately equal to an upper temperature limit. The after-care cycle further defines an idle state wherein the compressor remains deactivated until the drum temperature of the process air leaving the drum is approximately equal to a lower temperature limit. The after-care cycle is configured to operate for an after-care time period.

These and other features, advantages, and objects of the present device will be further understood and appreciated by those skilled in the art upon studying the following specification, claims, and appended drawings.

DETAILED DESCRIPTION OF EMBODIMENTS

Figure 1:
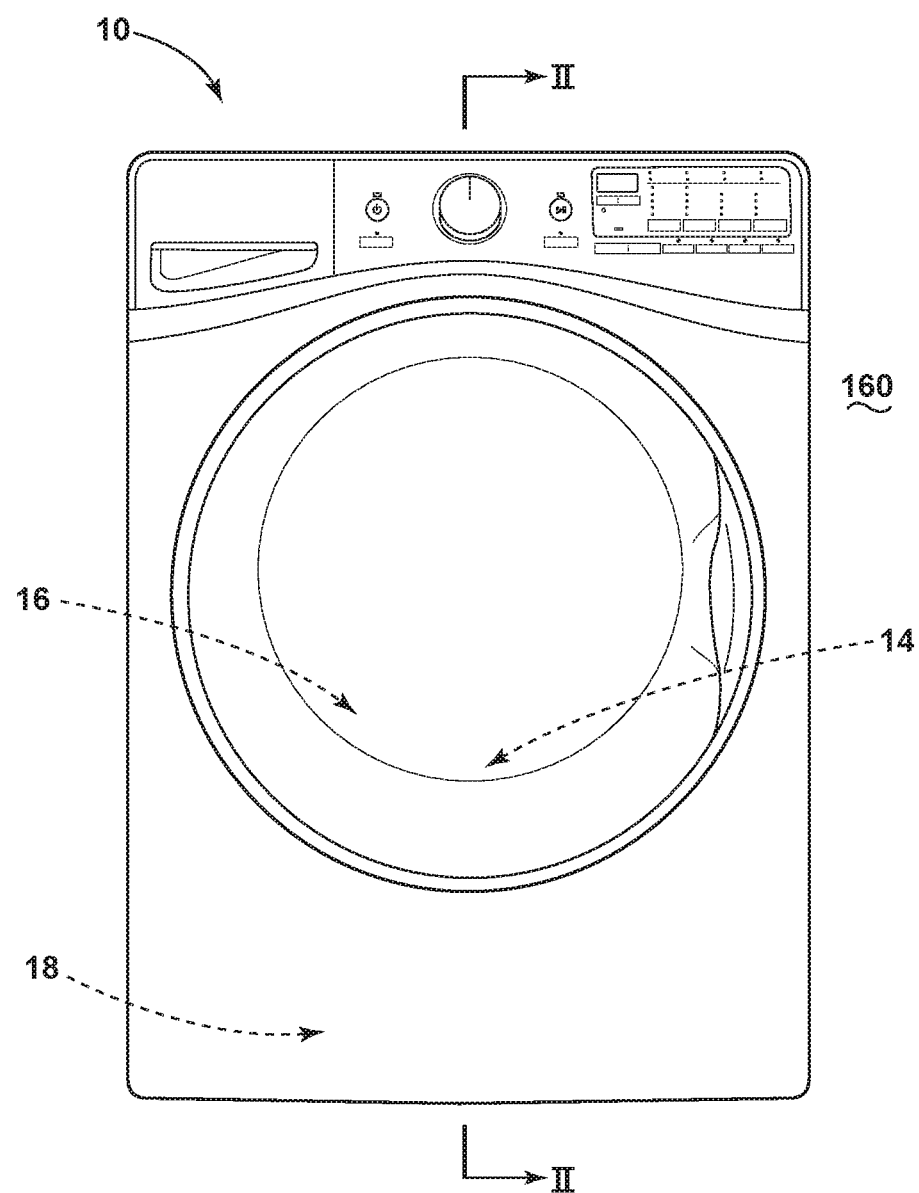
FIG. 1 is a front elevational view of a drying appliance that incorporates a system for performing an aspect of an after-care cycle on a load of laundry.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
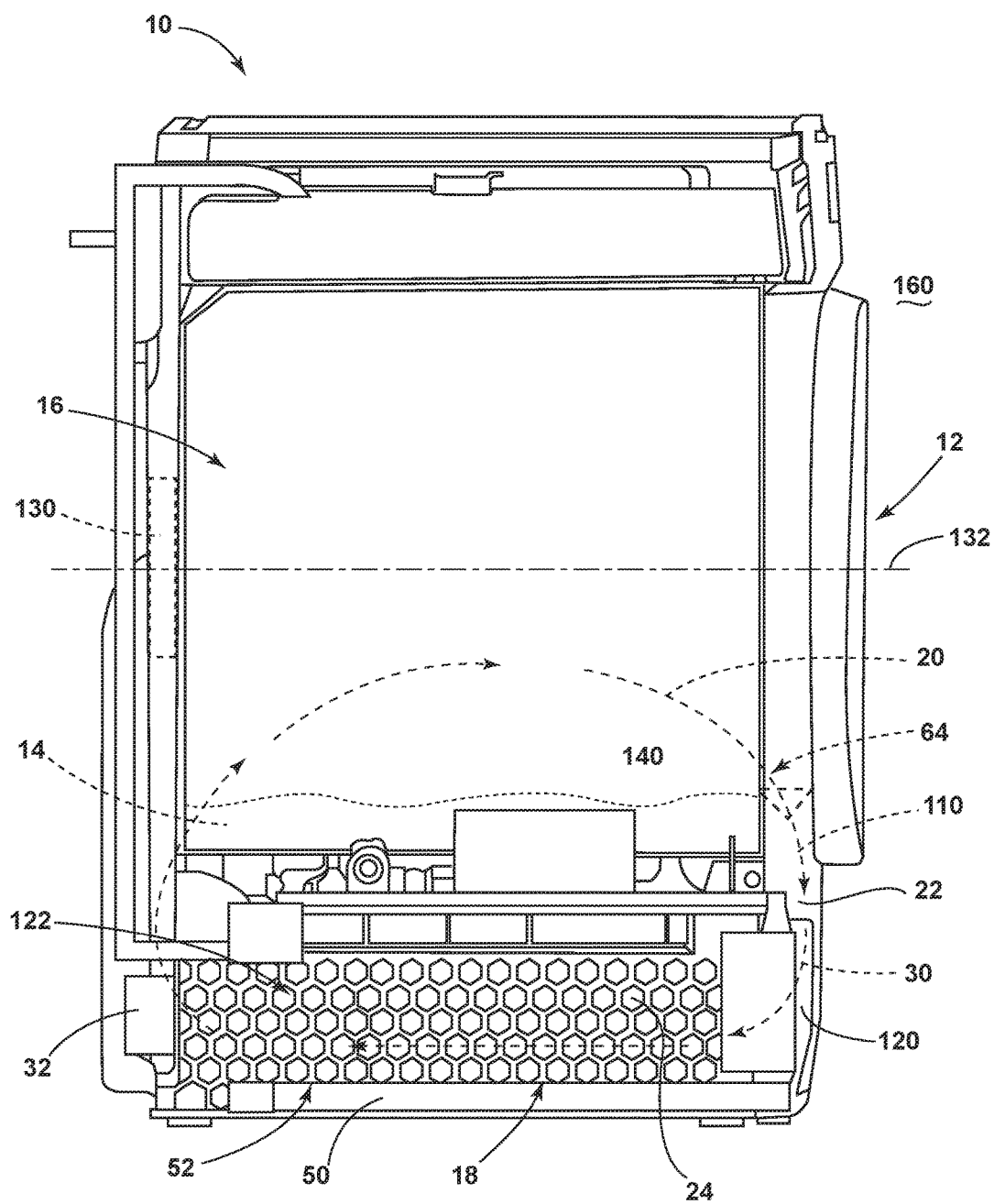
FIG. 2 is a cross-sectional view of the appliance of FIG. 1.
Figure 3:
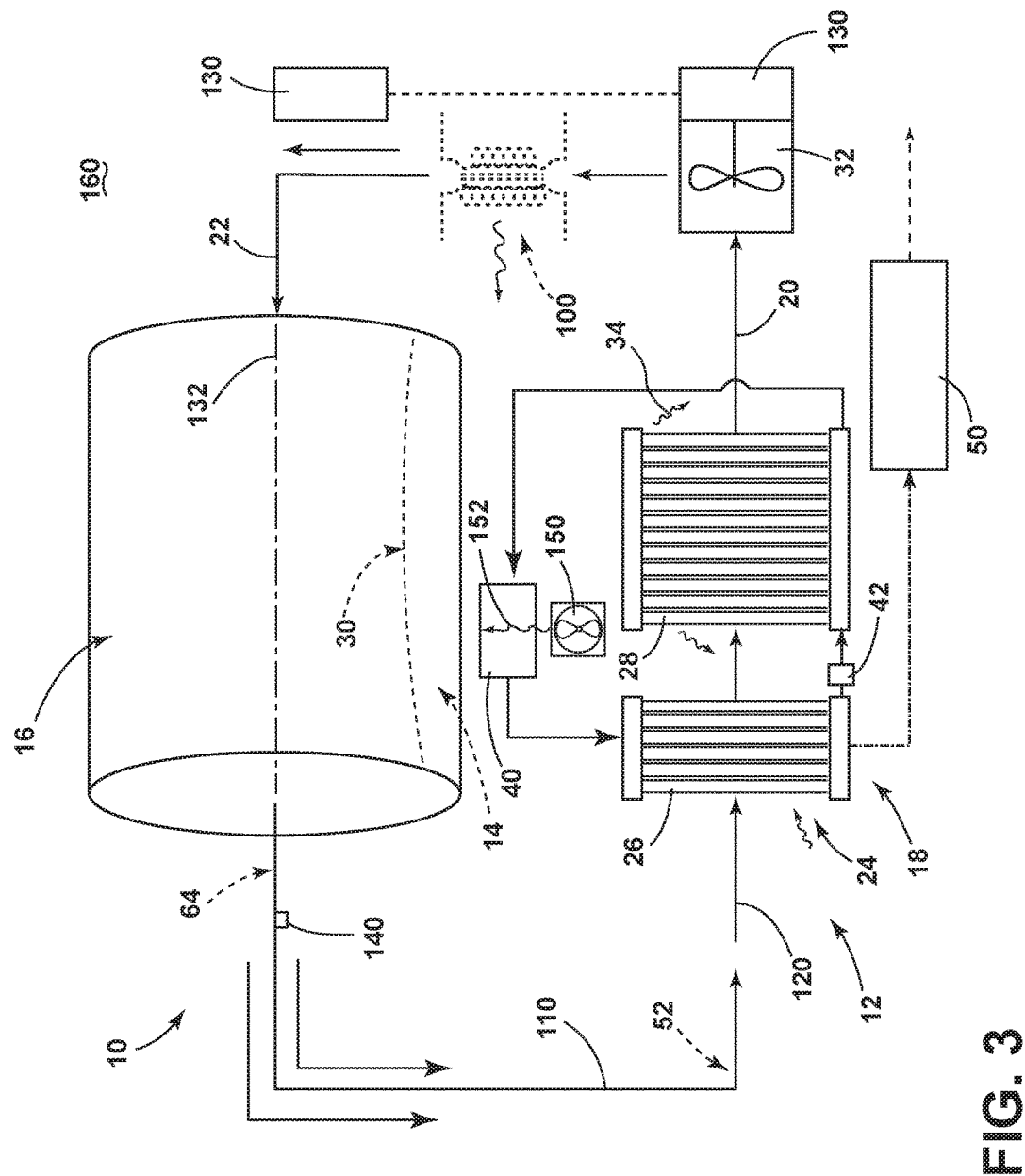
FIG. 3 is a schematic illustration of a heat pump drying appliance that can be used to perform various aspects of the after-care cycle.
Figure 4:
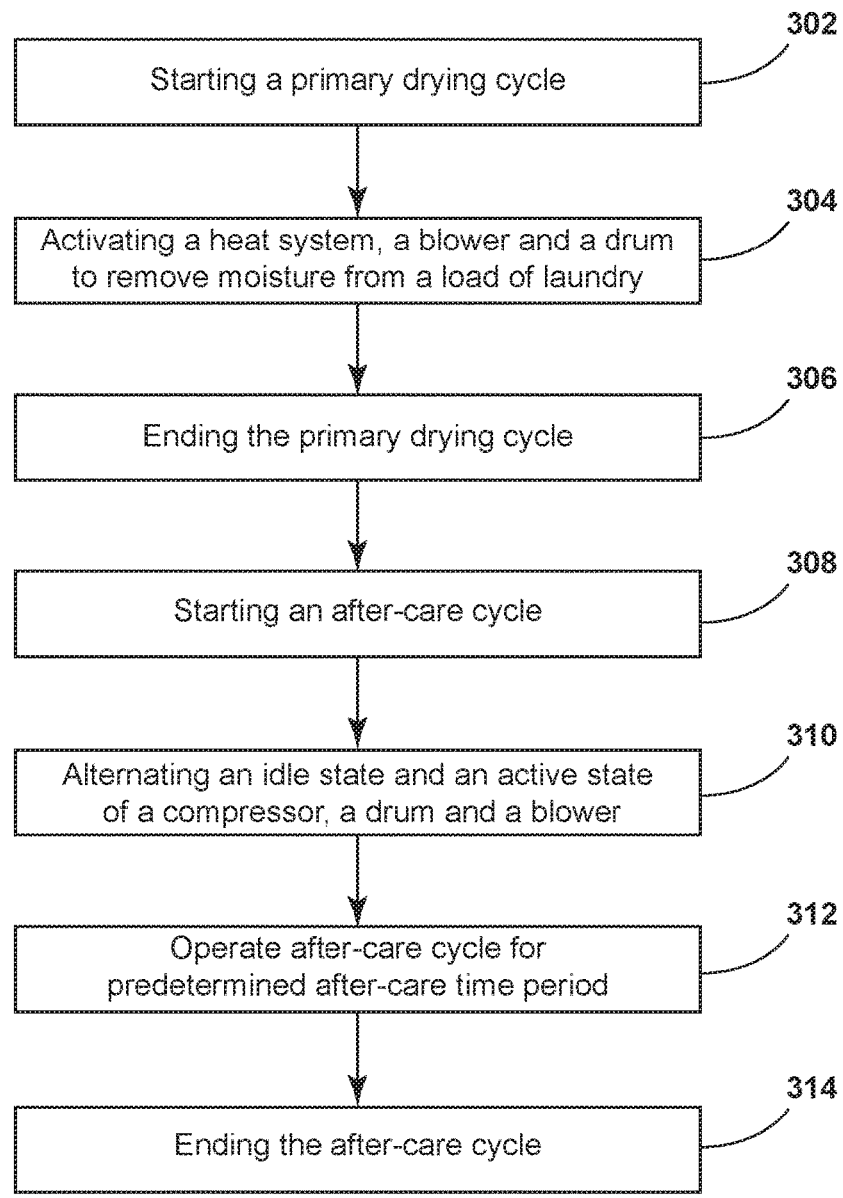
FIG. 4 is a schematic flow diagram illustrating a method for operating a drying appliance in performing a primary drying cycle and an after-care cycle.

As exemplified in FIGS. 1-3, reference numeral 10 generally refers to a laundry appliance and typically a drying appliance that can perform various primary drying cycles 12 for processing laundry 14 within a drum 16 of the appliance 10. To assist in processing the laundry 14 within the drum 16, a heat pump system 18 is configured to condition process air 20 that is moved through an airflow path 22. The heat pump system 18 typically includes one or more heat exchangers 24 in the form of an evaporator 26 and a condenser 28. The evaporator 26 is configured to dehumidify process air 20 that is delivered from the drum 16. The process air 20 delivered from the drum 16 can include moisture 30 and lint particles that are carried away from the load of laundry 14 and are moved by the blower 32 through the airflow path 22 to the evaporator 26. The condenser 28 of the heat pump system 18 rejects heat 34 from a surface of the condenser 28 and delivers this heat 34 into the process air 20. The process air 20 is thereby heated and then delivered back to the drum 16 for continuing the processing of laundry 14. The heat pump system 18 includes a compressor 40 that compresses a thermal exchange media, typically a refrigerant. The heat pump system 18 delivers the thermal exchange media to the evaporator 26, through an expansion device 42, to the condenser 28, and then back to the compressor 40. The blower 32 of the appliance 10 delivers process air 20 through the airflow path 22 that includes the rotating drum 16 and the various heat exchangers 24 of the heat pump system 18.

During performance of a particular drying cycle 12, moisture 30 is removed from the load of laundry 14 and is moved to the heat exchangers 24 where the dehumidification performed by the evaporator 26 causes the moisture 30 to form condensate that is captured within a drain channel 50 of the appliance 10. Additionally, various other residual fluid 52, including moisture 30, water vapor and condensate in the drain channel 50, is captured or otherwise deposited within portions of the airflow path 22 and can remain within the airflow path 22 after completion of the drying cycle 12.

Referring now to FIGS. 1-4, a method 300 is disclosed for operating a primary drying cycle 12 and an after-care cycle 60. In operating the appliance 10, the primary drying cycle 12 is activated (step 302). The compressor 40, the drum 16 and the blower 32 are configured to operate to perform a primary drying cycle 12 (step 304). After the drying cycle 12 is complete (step 306), the after-care cycle is initiated (step 308). The after-care cycle 60 can be performed through operation of the compressor 40, the drum 16 and the blower 32. This after-care cycle 60 is activated after completion of the drying cycle 12. The after-care cycle 60 defines an active state 62 where the compressor 40 and the drum 16 operate until the process air 20 leaving the drum 16 has a drum temperature 64 that is approximately equal to a temperature upper limit 66. When the drum temperature 64 reaches this temperature upper limit 66, the compressor 40 is typically deactivated. The after-care cycle 60 also defines an idle state 68 where the compressor 40 remains deactivated until the drum temperature 64 of the process air 20 leaving the drum 16 is proximate to a temperature lower limit 70. The upper and lower limits 66, 70 of the drum temperature 64 correspond to a predetermined temperature range 72 for operating the after-care cycle 60. The idle state 68 and the active state 62 are alternated during performance of the after-care cycle 60 (step 310). This after-care cycle is typically operated until the end of a predetermined after-care time period 80 (step 312). The expiration of this predetermined after-care time period 80 will end the after-care cycle 60 (step 314). The after-care timer period can also be ended at an earlier time by a manual intervention by the user of the appliance 10. Additional details of the predetermined temperature range 72 will be described more fully below.

The after-care cycle 60 is configured to be operated by the compressor 40, the drum 16 and the blower 32 for a length of time that corresponds to an after-care time period 80. Typically, the end of this after-care time period 80 will shut off the appliance 10 and end the after-care cycle 60 after a predetermined period of time. The after-care time period 80 can also end at the earlier of a manual termination of the after-care cycle 60 and the expiration of this predetermined after-care time period 80. According to various aspects of the device, this after-care time period 80 can be anywhere from four hours to nine hours and can typically be approximately six hours. Other time frames for the after-care time period 80 can also be used depending upon the design of the device and the needs of the user.

Figure 5:
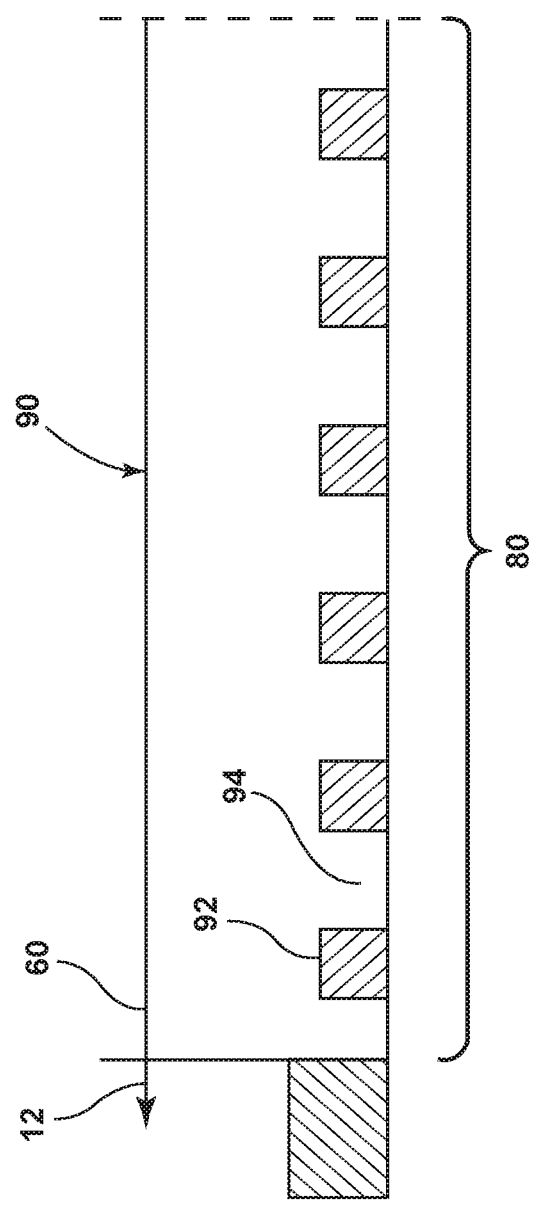
FIG. 5 is a schematic diagram illustrating operation of the various systems of the appliance over time during an after-care cycle.
Figure 6:
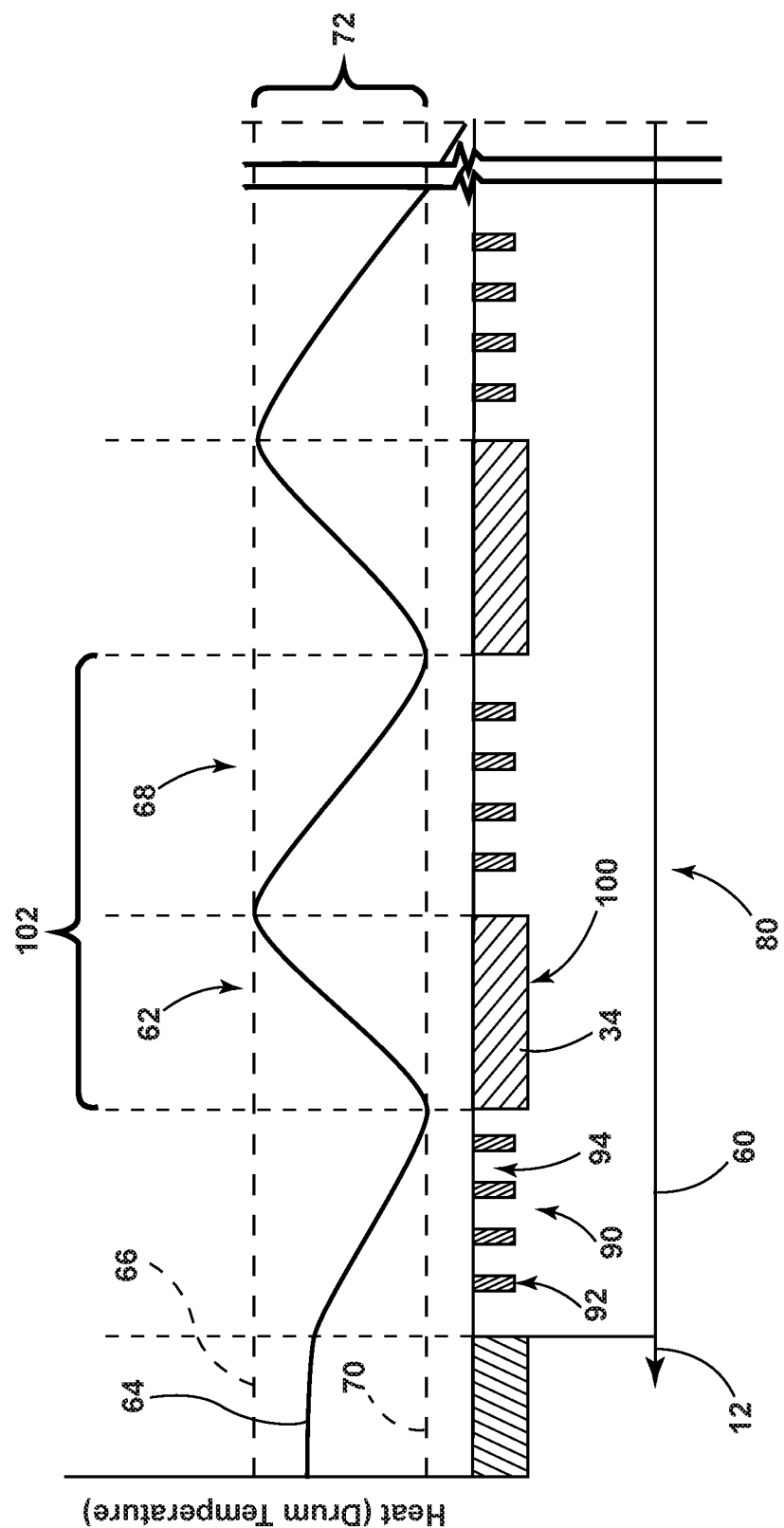
FIG. 6 is a schematic diagram illustrating operation of the various systems of the appliance over time during an after-care cycle.
Figure 7:
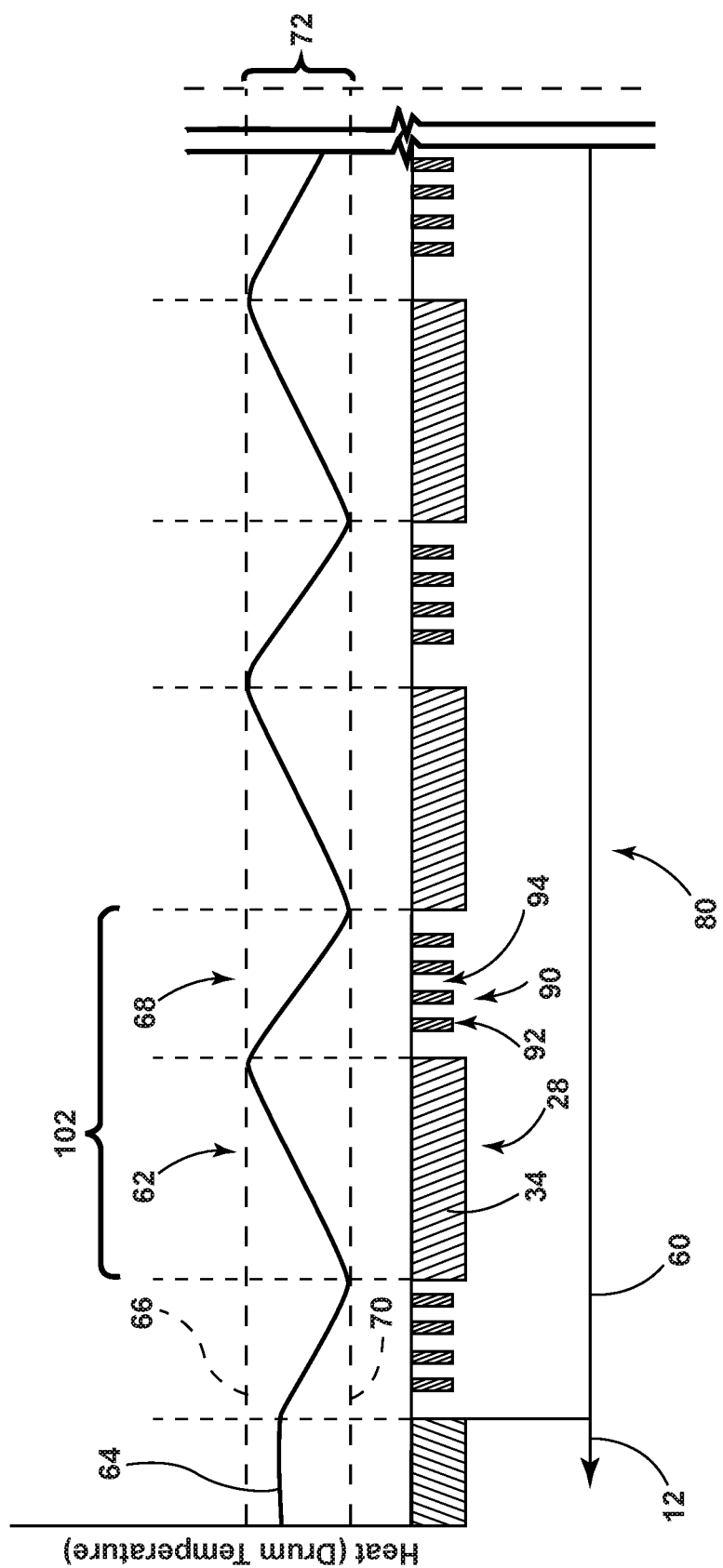
FIG. 7 is a schematic diagram illustrating operation of the various systems of the appliance over time during an after-care cycle.
Figure 8:
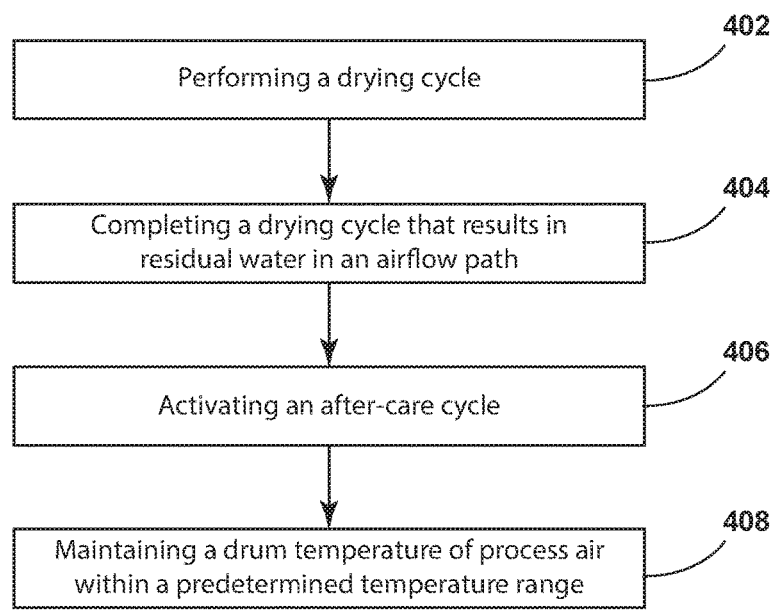
FIG. 8 is a schematic flow diagram illustrating a method for processing laundry after completion of a drying cycle using an after-care cycle.
Figure 9:
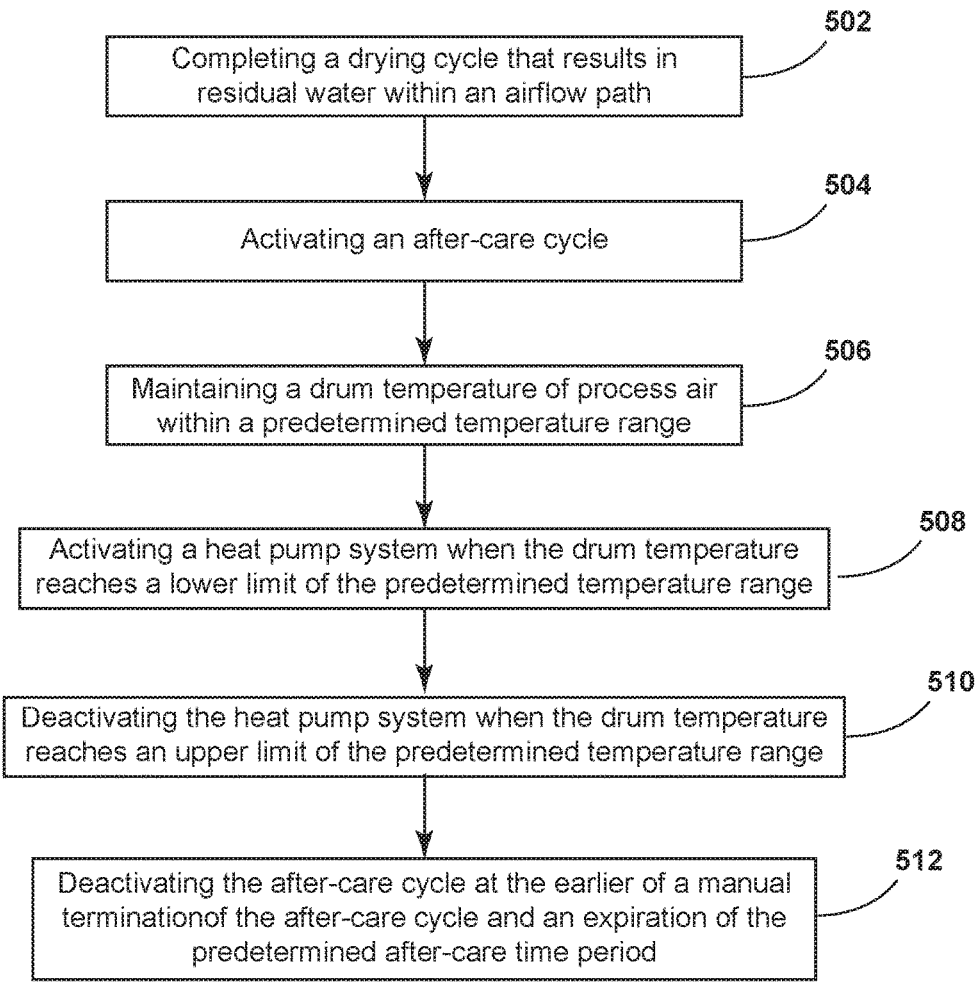
FIG. 9 is a schematic flow diagram illustrating a method for processing laundry after completion of a drying cycle using an after-care cycle.

Referring now to FIGS. 1-7, during the idle state 68 of the after-care cycle 60, the drum 16 and the blower 32 can define a tumbling condition 90. During this tumbling condition 90, the drum 16 and the blower 32 are intermittently activated and deactivated. These intermittent activations 92 and intermittent deactivations 94 of the drum 16 and blower 32 can serve to modify the positions of the various items of laundry 14 within the drum 16 so that during the active state 62, the process air 20 moved through the drum 16 can adequately move within and around the entire load of laundry 14 during performance of the after-care cycle 60. In this manner, as illustrated in FIGS. 5-7, the after-care cycle 60 can include various conditions that can be used within separate appliances 10 or used cooperatively within a single appliance 10 depending upon the type of laundry 14 that is being processed within the drum 16.

As exemplified in FIG. 5, the after-care cycle 60 can be in the form of the tumbling condition 90 where the drum 16 and blower 32 operate cooperatively and intermittently to alternate periods of intermittent activation 92 for processing and periods of intermittent activation 92 for rest. By way of example, and not limitation, the tumbling condition 90 can include a rest period of intermittent deactivation 94, followed by a tumbling operation of intermittent activation 92, where the drum 16 and blower 32 are each activated for a certain amount of time and where the drum 16 can rotate in a clockwise direction, counter-clockwise direction, or both. This tumbling operation can then followed by another period of rest. After the second period of rest, the drum 16 and the blower 32 can be activated again, where the drum 16 is rotated in the same direction or a different direction or different rotational pattern. These intermittent activations and deactivations 92, 94 of the drum 16 and blower 32 can be carried on for the duration of the after-care time period 80.

As exemplified in FIG. 6, the after-care cycle 60 can include a hybrid heater 100 that is typically in the form of a resistive heater that can be activated during the after-care cycle 60. In this aspect of the device, the after-care cycle 60 can include a tumbling condition 90 that is followed by an operation of the hybrid heater 100, drum 16 and blower 32 in the active state 62 where each is activated for a particular period of time. Again, this pattern can be a sequentially repeated operation 102 of the after-care cycle 60 and can be repeated for the duration of the after-care time period 80.

An electrically resistive hybrid heater 100 can be used as a heat source for elevating the drum temperature 64 of the process air 20 to the upper limit 66 of the predetermined temperature range 72. In various aspects of the device, no hybrid heater 100 is included and the primary heat source for modifying the temperature of the process air 20 is a condenser 28 for the heat pump system 18. Additionally, while an appliance 10 may include a hybrid heater 100, the hybrid heater 100 may be deactivated during performance of the after-care cycle 60. In such an embodiment, it is primarily the condenser 28 of the heat pump system 18 that is used for an elevating temperature of the process air 20 to the upper limit 66 of the predetermined temperature range 72.

In various aspects of the device, the electrically resistive heater 100 can be used as part of a condenser system that utilizes an air-to-air heat exchanger 24. The air-to-air heat exchanger 24 includes the air flow path 22 that directs process air 20 through the heater 100. The heated process air 20 is then directed into the drum 16 to process the laundry 14. The air-to-air heat exchanger 24 also includes a separate cooling air flow path 22 therein. This cooling air path uses a cooling fan to move cooler ambient air through the air-to-air heat exchanger 24 to lower the temperature of the process air 20 within the air flow path 22 of the air-to-air heat exchanger 24. The cooler ambient air is used to condense moisture present within the process air 20. The air-to-air heat exchanger 24 can be used to operate the primary drying cycle 12 and also the after-care cycle 60. In this manner, the air-to-air heat exchanger and the heater 100 can be operated during the after-care cycle 60 to maintain the drum temperature 64 of the process air 20 within the predetermined temperature range 72.

As exemplified in FIG. 7, the after-care cycle 60 can include a tumbling condition 90 that is followed by an operation of the compressor 40 and drum 16 in the active state 62 where heat 34 is provided by the condenser 28 of the heat pump system 18 for increasing the drum temperature 64 of the process air 20. In this aspect of the after-care cycle 60, the drum 16 and blower 32 are cooperatively and intermittently activated and deactivated during the tumbling condition 90. This tumbling condition 90 is then followed by an active state 62 of the compressor 40 and drum 16 where the condenser 28 provides heat 34 to the process air 20. This heated process air 20 is then delivered to the drum 16 for processing the laundry 14 during the after-care cycle 60. This pattern may also be repeated as a sequentially repeated operation 102 of the after-care cycle 60.

The pattern of idle state 68 and active state 62 can be the sequentially repeated operation 102 of the after-care cycle 60. Within this pattern of the idle state 68 and active state 62, various sub-routines can also be performed. Such sub-routines can include performance of the tumbling condition 90, patterns of drum rotation, or drum oscillation, varied operation of the blower 32 and/or the compressor 40 and other similar sub-routines of the after-care cycle 60.

During the after-care cycle 60, heat 34 from the hybrid heater 100 and/or the condenser 28 provides heat 34 to the process air 20 and at least partially evaporates a portion of the residual fluid 52 that is maintained within the airflow path 22 of the appliance 10. This moisture 30 added to the process air 20 forms moisture-laden process air 110 that enters the drum 16. The moisture-laden process air 110 can assist in removing wrinkles and freshening laundry 14 being processed within the drum 16 of the appliance 10. By adding moisture 30 to the process air 20, the heated process air 20 is more able to retain the heat 34 that is given off by the condenser 28 and/or the hybrid heater 100 of the appliance 10. The moisture-laden process air 110 is also efficient at releasing this heat 34 into the laundry 14, as will be described more fully below.

The inclusion of heat 34 within the process air 20 and the laundry 14 is critical to the performance of the after-care cycle 60. After the completion of the primary drying cycle 12, certain amounts of moisture 30 typically remain within the load of laundry 14 contained within the drum 16. This moisture 30 in the laundry 14 may contain various bacteria, microbes and other contaminants that may generate odor in the form of mildew, and other foul-smelling contaminants. Performance testing of the after-care cycle 60 has shown that populations of bacteria and other microbes can be diminished or held in check through the application of a certain amount of heat 34 within the process air 20 as it moves through the drum 16. The heated process air 20 having a drum temperature 64 that is within the particular predetermined temperature range 72 has been shown to be effective at killing at least a portion of the bacteria population and other microbe populations within the laundry 14 contained within the drum 16.

A lower limit 70 of this predetermined temperature range 72 has been found to approximately 35° C. At this temperature, the growth of bacteria within the laundry 14 can be mitigated and the amount of bacteria may be decreased when the process air 20 is heated to this lower limit 70 of the predetermined temperature range 72. The predetermined temperature range 72, for purposes of controlling bacteria population, may have no particular upper limit 66 as greater amounts of heat 34 will typically serve to kill more bacteria within the drum 16. However, where the process air 20 is heated to a temperature that is in excess of an upper limit 66 of the predetermined temperature range 72, the process air 20 heated to these excessive temperatures may cause damage to the clothing contained within a drum 16.

Performance testing of various aspects of the after-care cycle 60 have shown that an effective upper limit 66 of the predetermined temperature range 72 can be approximately 42° C. It should be understood that this upper limit 66 of the predetermined temperature range 72 can vary depending upon the type of laundry 14 being processed within the drum 16. Delicate fabrics may have a lower upper limit 66 in the form of a lower drum temperature 64 within this predetermined temperature range 72. Alternatively, more sturdy fabrics such as cotton may have a higher upper limit 66 in the form of a higher drum temperature 64 for this corresponding predetermined temperature range 72.

Using the after-care cycle 60 described herein, the process air 20 can be maintained within the predetermined temperature range 72 for processing laundry 14 during the after-care cycle 60. The process air 20 having a drum temperature 64 within this predetermined temperature range 72 has been shown to be effective at killing bacteria or at least preventing the growth of bacteria populations that can generate odor within damp laundry 14. Accordingly, during the performance of the after-care cycle 60 for the after-care time period 80, the load of laundry 14 can remain fresh smelling as a result of the process air 20 having a drum temperature 64 within the predetermined temperature range 72 for killing sufficient amounts of bacteria and preventing the growth of bacteria within a load of laundry 14. By controlling bacteria populations and, in turn, odors, the use of additional fragrancing products can be reduced. Additionally, the length of the after-care cycle 60 can allow a user of the appliance 10 to leave a load of laundry 14 within the drum 16 for an extended period of time without causing unwanted odors within the laundry 14.

Typically, the after-care cycle 60 will include the process air 20 being heated using the condenser 28 of the heat pump system 18. Additionally, by using the condenser 28, the amount of heat 34 delivered to the drum 16 via the process air 20 can be maintained within the predetermined temperature range 72 to effectively manage the population of bacteria within the laundry 14 and also to prevent substantial damage to the laundry 14 during operation of the after-care cycle 60.

Referring now to FIGS. 1-8, having discussed the various aspects of the after-care cycle 60 for the laundry appliance 10, a method 400 is disclosed for processing laundry 14 after completion of a primary drying cycle 12 using aspects of the after-care cycle 60. According to the method 400, a drying cycle 12 is performed to process laundry 14 within the drum 16 of the appliance 10 (step 402). After the drying cycle 12 is completed, residual fluid 52, typically in the form of water, is disposed within the airflow path 22 of the appliance 10, as a result of the performance of the drying cycle 12 (step 404). This residual fluid 52 can be within the ductwork 120 of the airflow path 22, within the heat exchange cavity 122 that houses the condenser 28 and evaporator 26, within the drum itself, within the laundry 14 located within the drum 16, and also within a drain channel 50 that is typically positioned below the evaporator 26 of the heat pump system 18. The residual fluid 52 within these portions of the appliance 10 can be used to add moisture 30 and humidity to the process air 20 during the after-care cycle 60.

According to the method 400, after the primary drying cycle 12 is complete, the after-care cycle 60 can be initiated (step 406). In this manner, the heat pump system 18 and the blower 32 are activated to deliver process air 20 and at least a portion of this residual fluid 52 to the drum 16. This residual fluid 52 is delivered as moisture 30 from the process air 20 that can allow greater amounts of heat 34 to be delivered to the drum 16. During performance of the after-care cycle 60, the drum temperature 64 of the process air 20 is maintained at the predetermined temperature range 72 during performance of the after-care cycle 60 (step 408).

When the blower 32 is activated, it is typical that the motor 130 for the blower 32 can be the same motor 130 that operates the drum 16 by rotating the drum 16 about a rotational axis 132. Accordingly, when the blower 32 is activated, rotation of the drum 16 is also activated for processing the laundry 14 during the after-care cycle 60. The drum 16 and the blower 32 may also be operated using separate and dedicated motors 130. Separate motors 130 may be incorporated for the drum 16 and the blower 32 where the drum 16 is configured for bi-directional rotation in clockwise and counterclockwise directions.

As exemplified in FIGS. 1-8, at the end of the primary drying cycle 12, the drum temperature 64 of the air and laundry 14 within the drum 16 may be at a level within or above the predetermined temperature range 72. In such a condition, activation of the after-care cycle 60 may be delayed. Accordingly, the step 406 of initiating the after-care cycle 60 can include a condition where the heat pump system 18 is placed in the active state 62 when the drum temperature 64 reaches the lower limit 70 of the predetermined temperature range 72. Similarly, the heat pump system 18, during the after-care cycle 60, can be deactivated, or placed in the idle state 68, when the drum temperature 64 of the process air 20 reaches the upper limit 66 of the predetermined temperature range 72. By maintaining the drum temperature 64 within the predetermined temperature range 72, the population of bacteria within the laundry 14 can be controlled to mitigate the presence of odor emanating from the laundry 14 over the course of the after-care cycle 60 without substantially causing damage to the laundry 14.

To assist in maintaining the drum temperature 64 within the predetermined temperature range 72, the drum temperature 64 can be measured by a temperature probe 140 that is disposed within the airflow path 22. Typically, the probe can be disposed within the airflow path 22 in a position downstream of the drum 16. It should be understood that the positioning of the temperature probe 140 can also be within the drum 16 or at a position upstream of the drum 16, depending upon the design of the appliance 10.

Referring once again to FIGS. 1-8, when the after-care cycle 60 is activated, operation of the drum 16 can be in either a clockwise or counterclockwise direction about the rotational axis 132 of the drum 16. Additionally, during the various tumbling conditions 90 of the after-care cycle 60, rotation of the drum 16 can be alternated or oscillated between a clockwise and counter-clockwise rotation. This two-way rotation of the drum 16 can achieve greater mixing and mingling of the items of laundry 14 within the drum 16. Accordingly, the process air 20 that has been heated to the predetermined temperature range 72 to be more effective at controlling the bacteria population within the drum 16 and the laundry 14 contained therein.

During the idle state 68 of the after-care cycle 60, when the compressor 40 is typically deactivated, the after-care cycle 60 can include an intermediate tumbling condition 90 that is performed after the drum temperature 64 reaches the upper limit 66 and before the drum temperature 64 reaches the lower limit 70 of the predetermined temperature range 72. As discussed above, this tumbling condition 90 serves to mingle and change positions of the various items of laundry 14 contained within the drum 16. By changing the position of the laundry 14 within the drum 16, the heated process air 20 may be spread more evenly throughout the entire load of laundry 14, over the performance of the after-care cycle 60.

Referring now to FIGS. 1-7 and 9, the method 500 is disclosed for processing a load of laundry 14 after completion of the primary drying cycle 12 using an after-care cycle 60. According to the method 500, a drying cycle 12 is completed that processes laundry 14 within the rotating drum 16 (step 502). Performance of the drying cycle 12 results in residual fluid 52 being disposed within at least the airflow path 22 that includes the drum 16. After completion of the drying cycle 12, the after-care cycle 60 is activated (step 504). The after-care cycle 60 is configured to operate for a predetermined after-care time period 80. As discussed previously, this after-care time period 80 can vary and is typically operated for an extended period of time, as discussed herein.

During performance of the after-care cycle 60, the drum temperature 64 of the process air 20 within the drum 16 is maintained at a predetermined temperature range 72 during performance of the after-care cycle 60 (step 506). To assist in maintaining the drum temperature 64 of the process air 20, the heat pump system 18 is activated, or placed in the active state 62, when the drum temperature 64 of the process air 20 reaches the lower limit 70 of the predetermined temperature range 72 (step 508). When the heat pump system 18 is activated, the condenser 28 rejects heat 34 into the process air 20 and allows for evaporation of the residual fluid 52 within the process air 20 in the form of moisture 30 that is delivered to the drum 16. The heat pump system 18 can then be deactivated or placed in the idle state 68 when the drum temperature 64 of the process air 20 reaches the upper limit 66 of the predetermined temperature range 72 (step 510). The completion or deactivation 94 of the after-care cycle 60 can take place at the earlier of the manual termination by the user deactivating the appliance 10 (step 512). Alternatively, deactivation 94 of the after-care cycle 60 can take place at the expiration of the predetermined after-care time period 80 as discussed above.

While residual fluid 52 is used in various aspects of the after-care cycle 60, certain configurations of the after-care cycle 60 may be performed without the use of residual fluid 52. In certain instances, a primary drying cycle 12 may result in little to no residual fluid 52 being deposited in the air flow path 22. Various aspects of the appliance 10 may remove substantially all of the residual fluid 52 from the air flow path 22 before the after-care cycle 60 is activated. Where little to no residual fluid 52 is included in the air flow path 22 for use in the after-care cycle 60, heat 34 can used without the addition of the residual fluid 52 for operating the after-care cycle 60. Water can also be added to the air flow path 22 or to the drum 16 during performance of the after-care cycle 60. As discussed previously, the heat 34 is used to control the growth of bacterial populations within the laundry 14 being processed within the drum 16.

Referring again to FIGS. 1-4, the heat pump system 18 can include a compressor cooling fan 150 that blows cooling air 152 across the surface of the compressor 40. According to various aspects of the device, the compressor cooling fan 150 typically remains deactivated when the after-care cycle 60 is in the active state 62. Accordingly, during the active state 62 of the after-care cycle 60, the compressor 40 and the motor 130 for the blower 32 of the drum 16 are switched on. At this time, the compressor cooling fan 150 is switched off.

As discussed above, the active state 62 in the after-care cycle 60 is maintained until the drum temperature 64 of the process air 20 reaches the upper limit 66 of the predetermined temperature range 72.

The amount of time that the after-care cycle 60 is in the active state 62 can vary depending upon various conditions within and around the appliance 10. Accordingly, the type of laundry 14 being processed within the drum 16, the ambient temperature 160 of the air around the appliance 10, the moisture content of the articles of clothing within the load, and other factors can increase or decrease the amount of time it takes for the condenser 28 of the heat pump system 18 to heat the process air 20 from the lower limit 70 of the predetermined temperature range 72 to the upper limit 66 of the predetermined temperature range 72. Similarly, these factors can bear on the amount of time it takes for the ambient conditions in and around the appliance 10 to allow the drum temperature 64 of the process air 20 and the temperature of the air within the drum 16 to decrease from the upper limit 66 from the upper temperature range 72 and back down to the lower limit 70 of the predetermined temperature range 72. Accordingly, the amount of time that the after-care cycle 60 defines the active and idle states 62, 68 can vary during the performance of differing drying cycles 12 in the particular appliance 10 and can also vary in a single performance of the after-care cycle 60. Because the conditions within and around the appliance 10 change over the course of the after-care cycle 60, the factors that bear on the amount of time that it takes for the drum 16 temperature of the process air 20 to fluctuate between the upper and lower limits 66, 70 can also vary during performance of the after-care cycle 60.

The various aspects of the device disclosed herein can be used within the various appliances 10. These appliances 10 can include, but are not limited to, drying appliances, combination washing/drying appliances, and other similar laundry-processing appliances.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A method for processing laundry after completion of a drying cycle, the method comprising steps of:
    maintaining residual fluid within an airflow path of an appliance, wherein the residual fluid results from a primary drying cycle;
    activating a heat pump system and a blower to deliver the residual fluid to a drum;
    maintaining a drum temperature within the drum at a predetermined temperature range during performance of an after-care cycle;
    cooperatively operating the heat pump system and the drum in an active state of the after-care cycle until process air leaving the drum has a drum temperature that is approximately equal to an upper temperature limit of the predetermined temperature range; and
    deactivating a compressor of the heat pump system in an idle state of the after-care cycle until the drum temperature of the process air leaving the drum is approximately equal to a lower temperature limit of the predetermined temperature range.

2. The method of claim 1, wherein the step of activating the heat pump system takes place at least when the drum temperature reaches a lower limit of the predetermined temperature range.

3. The method of claim 2, wherein after the heat pump system is activated, the heat pump system is deactivated when the drum temperature reaches an upper limit of the predetermined temperature range.

4. The method of claim 3, wherein the drum temperature is measured by a temperature probe disposed within the airflow path and downstream of the drum.

5. The method of claim 1, wherein the step of activating the blower includes activating a rotation of the drum in at least one direction.

6. The method of claim 1, wherein the predetermined temperature range is from approximately 35 degrees Celsius to approximately 42 degrees Celsius.

7. The method of claim 1, wherein the residual fluid is at least partially contained within a drain channel disposed beneath a heat exchanger of the heat pump system.

8. The method of claim 1, wherein the heat pump system includes a compressor cooling fan and the compressor cooling fan remains deactivated while the drum temperature is within the predetermined temperature range.

9. The method of claim 1, wherein after completion of the primary drying cycle, the heat pump system and the blower are configured to be activated and deactivated in a repeating operation that continues for a predetermined after-care time period.

10. The method of claim 9, wherein the repeating operation is configured to continue until an earlier of a manual termination of the repeating operation and an expiration of the predetermined after-care time period.

11. The method of claim 10, wherein the predetermined after-care time period is approximately 6 hours.

12. A method for processing laundry after completion of a drying cycle, the method comprising steps of:
maintaining residual fluid at least within an airflow path that includes a drum for processing laundry;
activating an after-care cycle that is configured to operate for a predetermined after-care time period;
maintaining a drum temperature within the drum at a predetermined temperature range during performance of the after-care cycle;
activating a heat pump system to define an active state of the after-care cycle when the drum temperature reaches a lower limit of the predetermined temperature range, wherein the residual fluid is delivered to the drum;
deactivating the heat pump system to define an idle state of the after-care cycle when the drum temperature reaches an upper limit of the predetermined temperature range;
repeating the active and idle states during the after-care cycle; and
deactivating the after-care cycle at an earlier of a manual termination of the after-care cycle and an expiration of the predetermined after-care time period.

13. The method of claim 12, wherein the after-care cycle includes a tumbling condition that is performed after the drum temperature reaches the upper limit and before the drum temperature reaches the lower limit.

14. The method of claim 12, wherein the step of activating the heat pump system also includes activating a motor that operates the drum about a rotational axis, and wherein the step of deactivating the heat pump system includes deactivating the motor.

15. The method of claim 14, wherein the motor that operates the drum also operates a blower for moving process air through the airflow path.

16. The method of claim 12, wherein the upper limit of the predetermined temperature range is approximately 42 degrees Celsius, and the lower limit of the predetermined temperature range is approximately 35 degrees Celsius.

17. The method of claim 12, wherein the predetermined after-care time period is approximately 6 hours.

18. A laundry appliance comprising:
a heat pump system having a compressor and a heat exchanger;
a drum that is configured to process laundry; and
a blower that delivers process air through an air flow path that includes the drum and the heat exchanger; wherein the compressor, the drum and the blower are configured to cooperatively operate to perform a drying cycle and an after-care cycle that is activated after completion of the drying cycle;
the after-care cycle defines an active state wherein the compressor and the drum are configured to cooperatively operate until the process air leaving the drum has a drum temperature that is approximately equal to an upper temperature limit;
the after-care cycle further defines an idle state wherein the compressor remains deactivated until the drum temperature of the process air leaving the drum is approximately equal to a lower temperature limit; and
the after-care cycle is configured to operate for an after-care time period.

19. The laundry appliance of claim 18, wherein during the idle state, the drum and the blower define a tumbling condition wherein the drum and the blower are intermittently activated and deactivated.

20. The laundry appliance of claim 18, wherein the after-care time period is configured to end at an earlier of a manual termination of the after-care cycle and an expiration of the after-care time period.

* * * * *